United States Patent
Greenwood et al.

(10) Patent No.: US 7,496,145 B2
(45) Date of Patent: Feb. 24, 2009

(54) METHOD AND APPARATUS FOR REDUCING TRANSMITTER PEAK POWER REQUIREMENTS WITH ORTHOGONAL CODE NOISE SHAPING

(75) Inventors: William C. Greenwood, Trophy Club, TX (US); Dale R. Anderson, Colleyville, TX (US); Ronald L. Porco, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 589 days.

(21) Appl. No.: 11/191,572

(22) Filed: Jul. 28, 2005

(65) Prior Publication Data

US 2007/0025455 A1 Feb. 1, 2007

(51) Int. Cl.
 *H04K 1/10* (2006.01)
(52) U.S. Cl. ........... 375/260; 375/296; 375/298; 375/297; 375/141; 375/135; 370/335
(58) Field of Classification Search ............ 375/296, 375/298, 135, 297, 141, 295, 260; 370/335; 600/515; 704/200.1
See application file for complete search history.

(56) References Cited

U.S. PATENT DOCUMENTS

| | | | | |
|---|---|---|---|---|
| 5,215,099 A | * | 6/1993 | Haberl et al. | 600/515 |
| 5,287,387 A | * | 2/1994 | Birchler | 375/296 |
| 5,381,449 A | * | 1/1995 | Jasper et al. | 375/298 |
| 5,638,403 A | * | 6/1997 | Birchler et al. | 375/296 |
| 5,864,794 A | * | 1/1999 | Tasaki | 704/200.1 |
| 5,903,551 A | * | 5/1999 | Kingston et al. | 370/335 |
| 7,319,713 B2 | * | 1/2008 | Viero et al. | 375/135 |
| 2003/0179832 A1 | | 9/2003 | Greenwood et al. | |
| 2003/0179833 A1 | * | 9/2003 | Porco et al. | 375/297 |
| 2003/0227823 A1 | * | 12/2003 | Carter et al. | 367/107 |
| 2006/0215732 A1 | * | 9/2006 | Chen et al. | 375/141 |

OTHER PUBLICATIONS

Viero et al. (Reducing the Crest Factor of a CDMA Downlink Signal by Adding Unused Channelization Codes; IEEE Communications Letters, vol. 6, No. 10; Oct. 2002; pp. 443-445).*

* cited by examiner

*Primary Examiner*—Sudhanshu C Pathak

(57) ABSTRACT

A method and apparatus for reducing peak transmitter power includes providing a set of orthogonal communication codes for a telecommunications system that includes a set of active user codes and a set of inactive user codes (1404). A communication signal is generated from the set of active user codes (1406). The peak-to-average power ratio of the communication signal is reduced by performing a peak cancellation function on the communication signal that minimizes energy distribution at least one of the set of active user codes and the set of inactive user codes (1410).

13 Claims, 7 Drawing Sheets

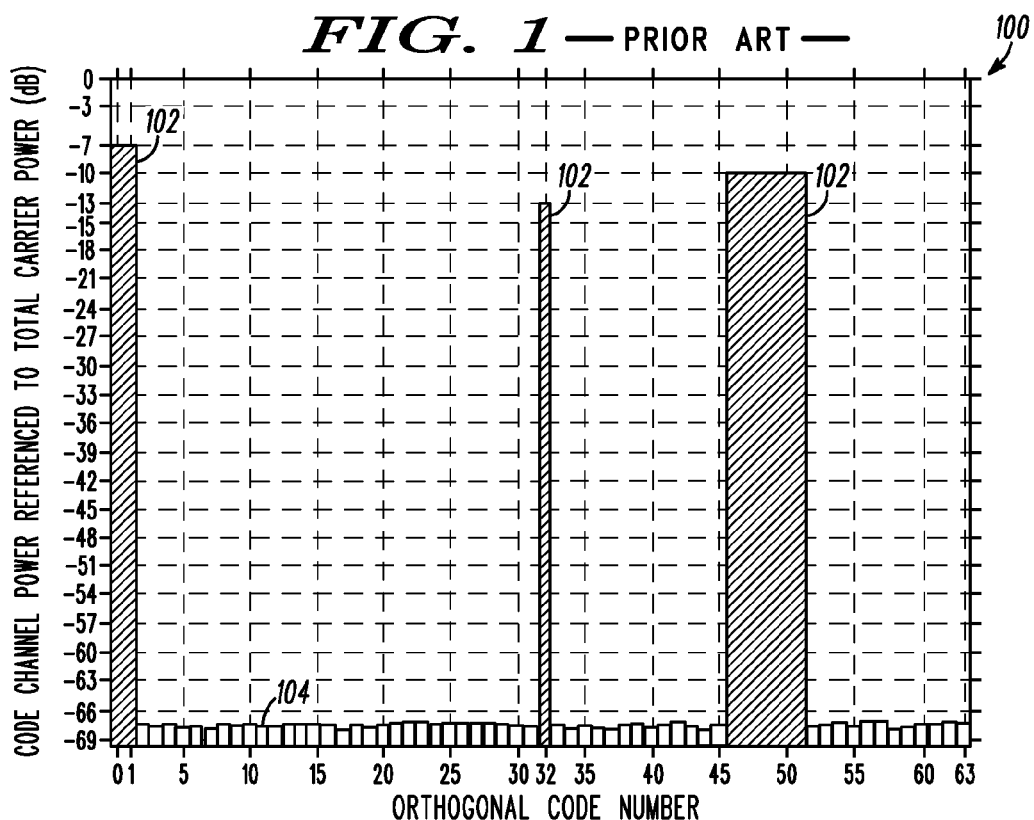
FIG. 1 — PRIOR ART —
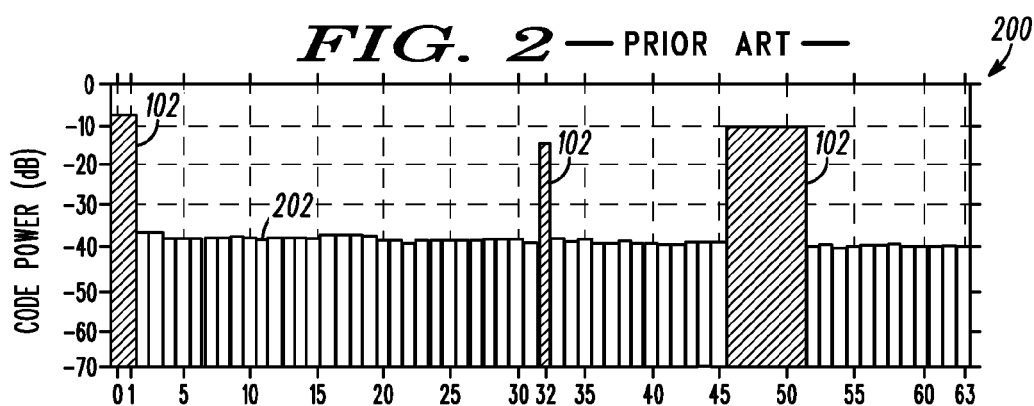
FIG. 2 — PRIOR ART —
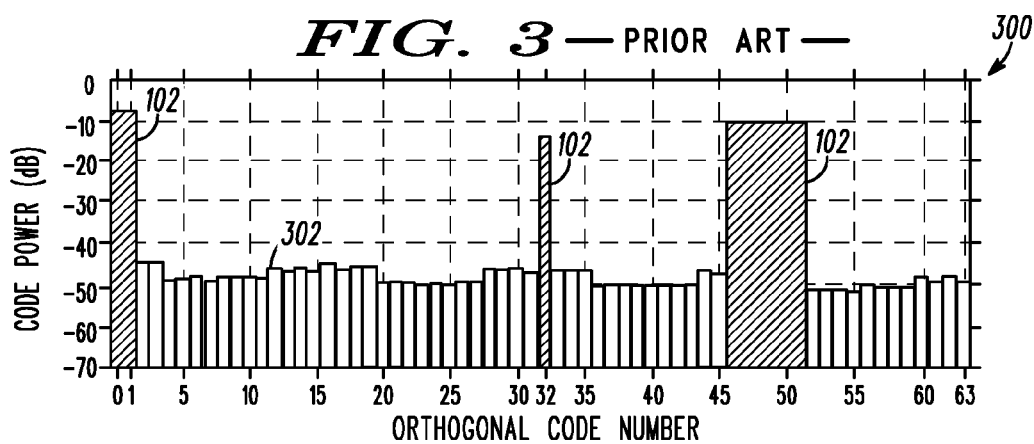
FIG. 3 — PRIOR ART —

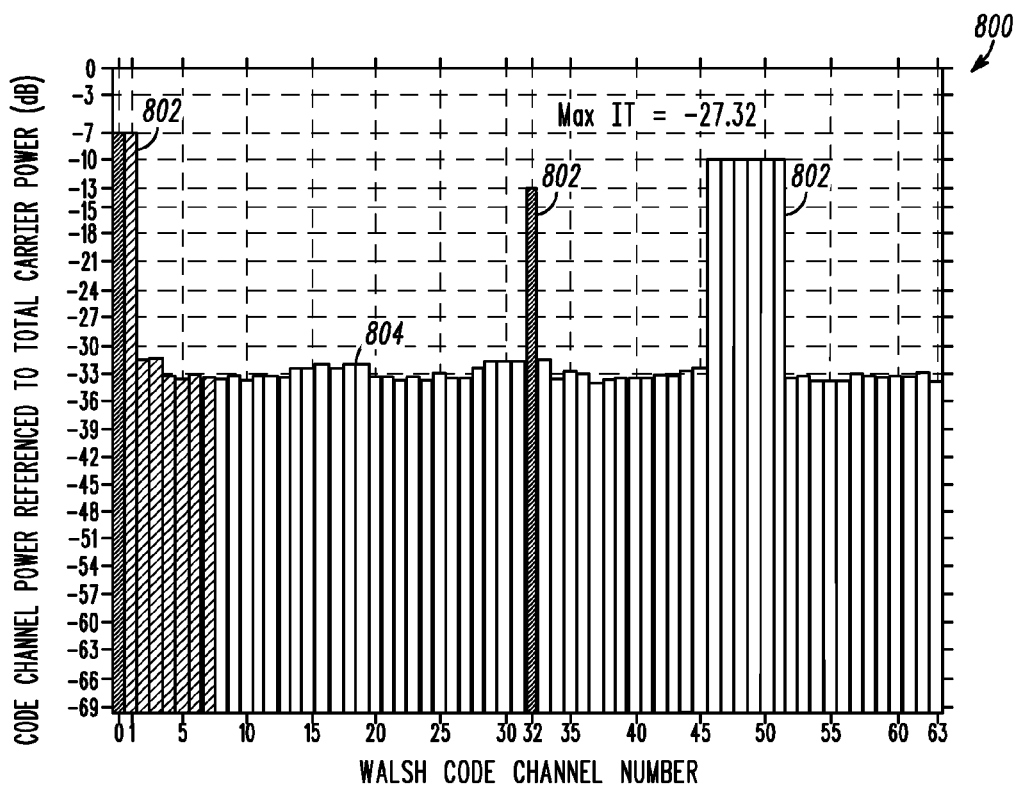
FIG. 8 — PRIOR ART —
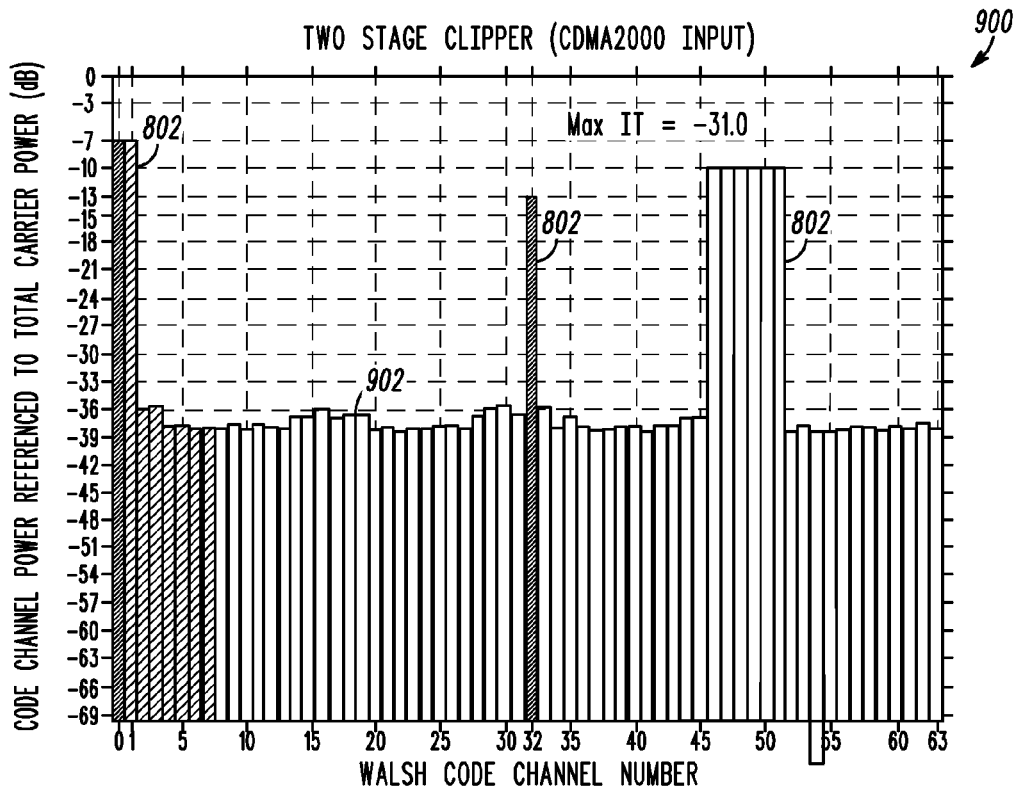
FIG. 9

METHOD AND APPARATUS FOR REDUCING TRANSMITTER PEAK POWER REQUIREMENTS WITH ORTHOGONAL CODE NOISE SHAPING

FIELD OF THE INVENTION

The present invention relates generally to communications systems. More specifically, but without limitation thereto, the present invention relates to a method and apparatus for reducing peak power requirements of transmitters used in telecommunications systems.

BACKGROUND OF THE INVENTION

In a typical radio communications system, linear power amplifiers are used to broadcast communication signals from a base station. A problem in the design of a linear power amplifier is accommodating widely fluctuating input signal power levels while producing an accurate reproduction of the input signal at the output of the amplifier. The peak signal power may exceed the average signal power at any time by several decibels and even 10 decibels or more. The peak-to-average power ratio is the ratio of the peak power of a signal to the average signal power. In a linear power amplifier, the peak-to-average power ratio is a critical factor in the cost, complexity, and size of a linear power amplifier. Even a small reduction in the peak-to-average power ratio can result in a substantial improvement in performance and reduction in cost.

Unfortunately, any attempt to reduce the peak-to-average power ratio of a signal by a processing function typically results in reduced spectral performance in the form of splatter, that is, signal energy that extends beyond the frequency band allocated to the signal. Splatter is highly undesirable because it interferes with communications on adjacent channels. Methods used to reduce the peak-to-average power ratio include hard clipping and soft clipping. In hard clipping, each signal magnitude that exceeds a clipping threshold is reduced to a selected maximum value, typically the clipping threshold. Hard clipping results in a high degree of splatter. In soft clipping, the input signal is altered by a non-linear function that reduces the signal peak magnitudes, resulting in less energy being splattered into adjacent channels compared to hard clipping.

DESCRIPTION OF THE SEVERAL VIEWS OF THE DRAWINGS

The following drawings are presented by way of example and not limitation, wherein like references indicate similar elements throughout the several views of the drawings, and wherein:

FIG. 1 illustrates a bar graph of orthogonal code domain power in a telecommunications system of the prior art with no peak cancellation;

FIG. 2 illustrates a bar graph of orthogonal code domain power of a telecommunications system of the prior art with a hard limit (clipped) peak cancellation function;

FIG. 3 illustrates a bar graph of orthogonal code domain power of a telecommunications system of the prior art with an inverted Hanning peak cancellation function;

FIG. 8 illustrates a bar graph of orthogonal code domain power of a telecommunications system after a single stage of peak cancellation according to the prior art;

FIG. 9 illustrates a bar graph of orthogonal code domain power of a telecommunications system after two stages of peak cancellation;

Figure 4:
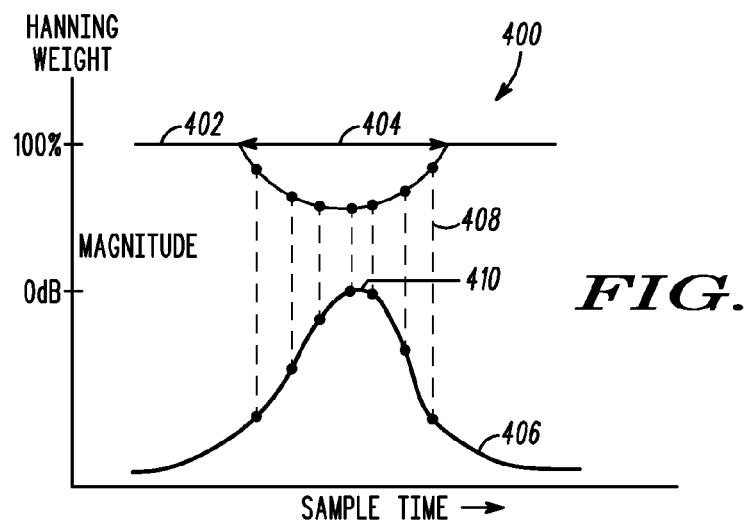
FIG. 4 illustrates a plot of an inverted Hanning weighting function for peak cancellation having a window length selected to minimize the energy distributed over the inactive user codes.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that are useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific sequence; however, practitioners of the art will understand that the specific sequence is not a requirement. Also, the terms and expressions used in the description have the ordinary meanings accorded to such terms and expressions in the corresponding respective areas of inquiry and study except where other meanings have been specifically set forth herein.

Pursuant to the following teachings, the power in the unused orthogonal codes of an orthogonal code set is distributed more evenly than by previous methods, thereby making possible a greater reduction in the peak-to-average power of a communication signal within the code orthogonality metric requirement of a telecommunications system. Although not represented graphically, the same performance advantages described for unused orthogonal codes may also apply to the used orthogonal codes.

Prior to describing various embodiments for reducing transmitter peak power requirements with orthogonal code noise shaping, certain relevant aspects of previous telecommunications systems are briefly described.

In a previous method of reducing the peak-to-average power ratio of a communication signal, each peak magnitude in a series of time samples of the communication signal that exceeds a clipping threshold is detected. A time window is centered on the time sample having the highest magnitude, and each of the samples in the window is attenuated by a clipping weighting function. Typical window clipping weighting functions include but are not limited to Blackman-Harris, Hanning, inverted Hanning, and other non-linear weighting functions.

By limiting the peak magnitude of the communications signal, linear radio frequency (RF) power amplifiers may be sized much smaller and the telecommunications system transmitter may be run more efficiently. Peak canceling techniques alter the frequency domain, time domain, and orthogonal code characteristics of the communications signal at the power amplifier input. To achieve the benefit of the greatest possible reduction in the peak-to-average power ratio, the frequency domain, time domain, and orthogonal code characteristics must be managed to meet system specifications.

Many communication systems rely on code orthogonality to distinguish users and information. For example, in a code division multiple access (CDMA) system, each user is assigned a unique set of orthogonal codes. Equation (1) below illustrates how each user is assigned a set of orthogonal codes.

$$S = \sum_{i=0}^{P} \sum_{m=0}^{M} x_i \cdot W_{i,m}^{M} \qquad \text{Equation (1)}$$

In equation (1), S represents the orthogonal baseband data prior to spreading, i represents the orthogonal code number, P represents maximum number of orthogonal codes, m represents the sample index, M represents the number of chips in the orthogonal function, $x_i$ represents the user data assigned to orthogonal code i, and W represents an orthogonal function.

In a CDMA system, the summation result S from equation (1) is filtered and spread by the chipping rate. Typically, not all codes in the set of orthogonal codes are used simultaneously. In other words, the set of orthogonal codes includes a set of active user codes and set of inactive user codes. The orthogonal nature of the codes allows each user to be distinguished from other users. This is accomplished by correlating the set of orthogonal codes with the received data as shown below in equation (2).

$$\rho_i = \frac{\sum_{n=0}^{N} \left| \sum_{m=0}^{M} R_m(n) \cdot W_{i,m}^{M*} \right|^2}{\sum_{m=0}^{M} |W_{i,m}^{M*}|^2 \cdot \sum_{m=0}^{N} \left| \sum_{m=0}^{M} R_m(n) \right|^2} \qquad \text{Equation (2)}$$

In equation (2), p represents the power per orthogonal code, i represent the orthogonal code number, n represents the orthogonal measurement interval index, N represents the number of orthogonal function intervals in the measurement interval, m represents the sample index, M represents the number of chips in the orthogonal function, R represents the received signal, and W represents the orthogonal function. $W_m^{M*}$ represents the complex conjugate of the orthogonal function.

The numerator in equation (2) is the cross correlation of the received data, $R_m(n)$, and the orthogonal code set, $W_m^M$. The denominator in the equation normalizes the power for each orthogonal code. Correlating the received data with the entire orthogonal code set shows higher power levels in the active user codes and lower uniform power levels in the inactive user codes.

FIG. 1 illustrates a bar graph 100 of orthogonal code domain power of a telecommunications system of the prior art with no peak cancellation. Shown in FIG. 1 are power levels for active user codes 102 and power levels for inactive user codes 104. The inactive user codes are essentially interference as they contain no encoded information. In a system that does not utilize a peak canceling technique, the power level of the inactive user codes is determined by the channel filter characteristics, the linearity of the system, and the gain and phase balance of the baseband data.

Air interface specifications dictate the allowable power level of an inactive user code. The allowable power level of an inactive user code is expressed as a peak power delta referenced to the channel power. Peak canceling techniques affect the code orthogonality by redistributing the peak spectral energy among the orthogonal codes. This follows from limiting the envelope peaks of the communication signal, which changes the correlation result in equation (2). Aggressive peak limiting may drive the power level of the inactive user codes and the error of the active user codes up to an unacceptable level. To gain the most benefit from the peak canceling technique, it is desirable to maintain the orthogonal nature of the user codes.

The simplest peak cancellation techniques employ a clipping mechanism that limits the magnitude of the complex communication signal to a fixed threshold, or hard limit. The square of the communication signal voltage represents the power envelope of the communication signal. Hard limiting of the peak magnitude of the communication signal can achieve the desired peak-to-average power ratio, but at the cost of poor spectral performance, or splatter.

As the peak cancellation function changes the envelope shape of the communication signal, the correlation result is changed as shown in equation (2) by distributing the peak spectral energy of the user codes over the other user codes. In some cases, there may be a general rise in the power level of all the inactive user codes. In other cases, the energy in one inactive user code may rise more than in the other inactive user codes. Because the air interface standard defines the figure of merit as the difference between the peak power of the inactive user codes and the total channel power, a general rise in the energy of all the inactive user codes is more advantageous than a higher energy in one inactive user code. In some cases, a compromise is necessary in that the peak energy is distributed non-uniformly over the inactive user codes. As a result, the peak magnitude of the communication signal is reduced at the expense of raising the correlation noise floor of all the inactive user codes.

FIG. 2 illustrates a bar graph 200 of orthogonal code domain power of a telecommunications system of the prior art with a hard limit (clipped) peak cancellation function. Shown in FIG. 2 are code domain power levels for active user codes 102 and code domain power levels for inactive user codes 202.

In FIG. 2, clipping the communication signal envelope peaks to a hard limit raises the noise floor of the inactive user codes 202 from about −67 dB in FIG. 1 to about −37 dB.

FIG. 3 illustrates a bar graph 300 of orthogonal code domain power of a telecommunications system of the prior art with an inverted Hanning peak cancellation function. Shown in FIG. 3 are code domain power levels for active user codes 102 and code domain power levels for inactive user codes 302.

In FIG. 3, applying an inverted Hanning weighting function to the communication signal reduces the magnitude peaks in the communication signal envelope. As a result, the noise floor of the inactive user codes 302 is raised from about −67 dB in FIG. 1 to about −50 dB for the same peak-to-average power ratio achieved by the hard clipping function illustrated in FIG. 2. Compared to the hard clipping function, the Hanning weighting function advantageously reduces the code correlation noise floor from −37 dB to −50 dB.

In one method of improving the peak energy distribution over the inactive user codes, the length of the peak cancellation function is adjusted so that energy distribution among the set of inactive user codes is minimized. The adjusted length of the peak cancellation function is dependent on the characteristics of the communication signal envelope. As a result of adjusting length of the peak cancellation function to minimize energy distribution among the set of inactive user codes, the power in the unused orthogonal codes of an orthogonal code set is distributed more evenly than by previous methods, thereby making possible a greater reduction in the peak-to-average power of a communication signal within the code orthogonality metric requirement of a telecommunications system. In other words, minimizing the energy distribution among the set of inactive user codes as described below provides a way to make transmitters at lower cost and to operate them at higher efficiency than before.

In accordance with various embodiments, one method for reducing peak transmitter power includes providing a set of orthogonal communication codes for a telecommunications system that includes a set of active user codes and a set of inactive user codes. A communication signal is generated from the set of active user codes. The peak-to-average power ratio of the communication signal is reduced by applying a peak cancellation function to the communication signal that minimizes energy distribution over the set of inactive user codes. The peak cancellation function may be realized, for example, as an inverted Hanning window weighting function having a window length that is adjusted to minimize the energy distribution over the set of inactive user codes.

FIG. 4 illustrates a plot 400 of an inverted Hanning weighting function for peak cancellation having a window length that is selected to minimize the energy distributed over the set of inactive user codes. Shown in FIG. 4 are an inverted Hanning window weighting function 402 having an adjustable window length 404, a magnitude 406 of a complex communication signal generated from the set of active user codes, sample intervals 408, and a peak signal magnitude 410.

In FIG. 4, the value of the inverted Hanning weighting function 402 at each sample interval 408 is multiplied by the magnitude 406 of the complex communication signal to reduce the peak-to-average power of the communication signal. The window length 404 of the weighting function is adjusted to minimize the energy distributed over the inactive user codes.

Figure 5:
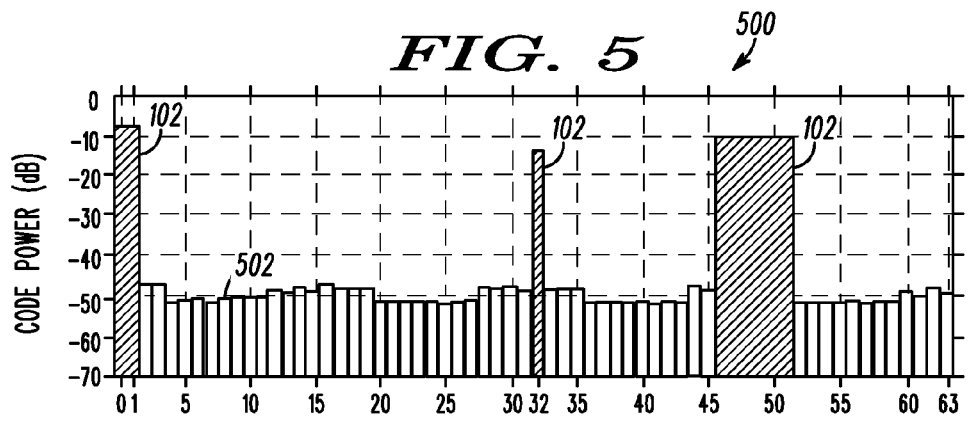
FIG. 5 illustrates a bar graph of orthogonal code domain power of a telecommunications system with a non-linear peak cancellation function having a window length selected so that minimum energy is distributed over the inactive user codes according to the weighting function of FIG. 4.

FIG. 5 illustrates a bar graph 500 of orthogonal code domain power of a telecommunications system with a peak cancellation function having a window length selected so that minimum energy is distributed over the inactive user codes according to the weighting function of FIG. 4. Shown in FIG. 5 are code domain power levels for active user codes 102 and code domain power levels for inactive user codes 502.

In FIG. 5, adjusting the window length of the peak cancellation function to minimize the energy distributed over the inactive user codes 502 results in a substantially uniform orthogonal code noise floor. Initially, the window length of the peak cancellation function is estimated to achieve a desired peak-to-average power ratio and a desired spectral performance, that is, the maximum allowable splatter. The peak cancellation function is then applied to the input signal, and the spectral performance of the processed signal is measured and compared to the desired spectral performance. If the spectral performance of the processed signal is less than the desired spectral performance, then the window length of the peak cancellation function is increased in coarse steps until the desired spectral performance is achieved. When the spectral performance is adequate, the peak-to-average power ratio is measured and compared to the desired peak-to-average power ratio. If the measured peak-to-average power ratio is greater than the desired peak-to-average power ratio, then the window length of the peak cancellation function is reduced in steps having a length that is smaller than the coarse step length, and the input signal is processed again until the desired peak-to-average power ratio is achieved. In this manner, the window length of the peak cancellation length is adjusted to meet both the spectral performance and the peak-to-average power ratio criteria.

Figure 6:
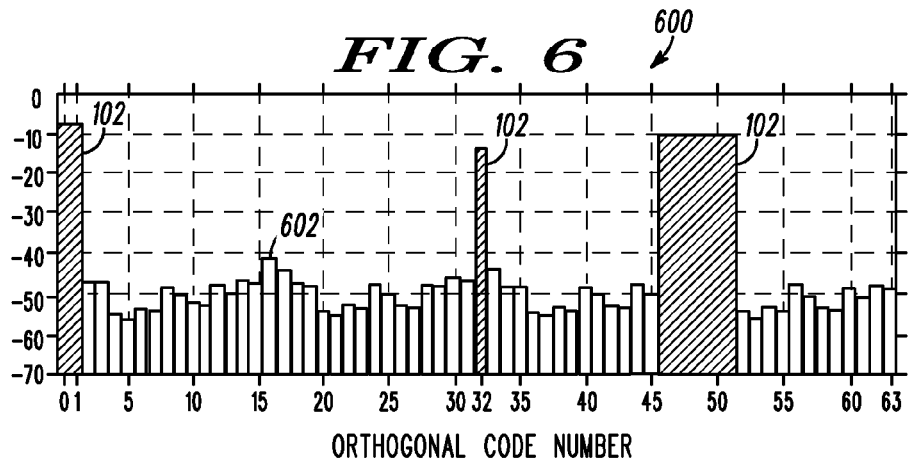
FIG. 6 illustrates a bar graph of orthogonal code domain power of a telecommunications system with a peak cancellation function having a window length that is not selected to minimize energy distributed over the inactive user codes.

FIG. 6 illustrates a bar graph 600 of orthogonal code domain power of a telecommunications system with a peak cancellation function having a window length that is not selected to minimize energy distributed over the inactive user codes. Shown in FIG. 6 are code domain power levels for active user codes 102 and code domain power levels for inactive user codes 602.

In FIG. 6, the inverted Hanning window function effectively reduces splatter; however, the code correlation error is unevenly distributed over the inactive user codes, resulting in a code domain noise floor that may peak above the code orthogonality metric requirement of, for example, the peak code domain error specification of −27 dB for a CDMA-2000 telecommunications system.

The peak code domain error is the worst-case error in all of the user codes. The inactive code error may be represented graphically to illustrate the difference in correlation magnitude between the active user codes versus the inactive user codes in the code set of, for example, a 16QAM (quadrature amplitude modulated) signal. The inventors have experimentally determined that the window length of the peak cancellation function may be adjusted to optimize the uniform distribution of code correlation error over the user codes.

Alternatively, the power distribution over user codes may be improved by applying the peak cancellation to the communication signal in multiple stages connected in series. For example, the output of one inverted Hanning weighting function may be connected to the input of another inverted Hanning weighting function identical to the first to construct a two-stage peak cancellation function.

Figure 7:
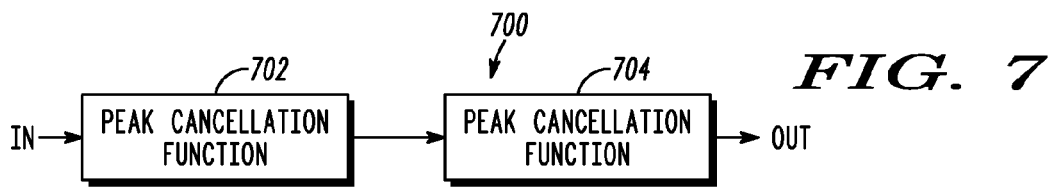
FIG. 7 illustrates a multiple stage peak cancellation function.

FIG. 7 illustrates a multiple stage peak cancellation function 700. Shown in FIG. 7 are a first peak cancellation function 702 and a second peak cancellation function 704.

The peak cancellation functions 702 and 704 are weighting functions, for example, inverted Hanning weighting functions, connected in series as shown, or alternatively in parallel. Because the orthogonality metric is based on the correlation of the received signal and the set of orthogonal codes, the correlation result may be manipulated by using multiple stages of the peak cancellation function connected in series. Given a selected peak cancellation function window length, single-stage and two-stage peak cancellation functions have been applied to the same communication signal in the following examples. The output of the peak cancellation function has the same peak-to-average power characteristics for both the single-stage and two-stage configurations.

FIG. 8 illustrates a bar graph 800 of orthogonal code domain power of a telecommunications system after a single stage of peak cancellation according to the prior art. Shown in FIG. 8 are active user code correlation envelope power levels 802 and inactive user code correlation envelope power levels 804.

In FIG. 8, the figure of merit is the maximum peak power of an inactive user code, which is shown for code channel number 33 as about −27 dB.

FIG. 9 illustrates a bar graph 900 of orthogonal code domain power of a telecommunications system after two stages of peak cancellation. Shown in FIG. 9 are active user code correlation envelope power levels 802 and inactive user code correlation envelope power levels 902.

In FIG. 9, two stages of peak cancellation were placed in series. For an equivalent peak-to-average power ratio at the power amplifier input, the orthogonal code domain noise floor has improved by approximately 4 dB compared to the single stage configuration. The maximum correlation envelope power of an inactive user code is shown on the plot as about −31 dB.

By combining the methods of optimizing the window length of the peak cancellation function and applying the peak cancellation function in multiple stages, a further improvement in the inactive user code correlation power noise floor may be achieved.

Figure 10:
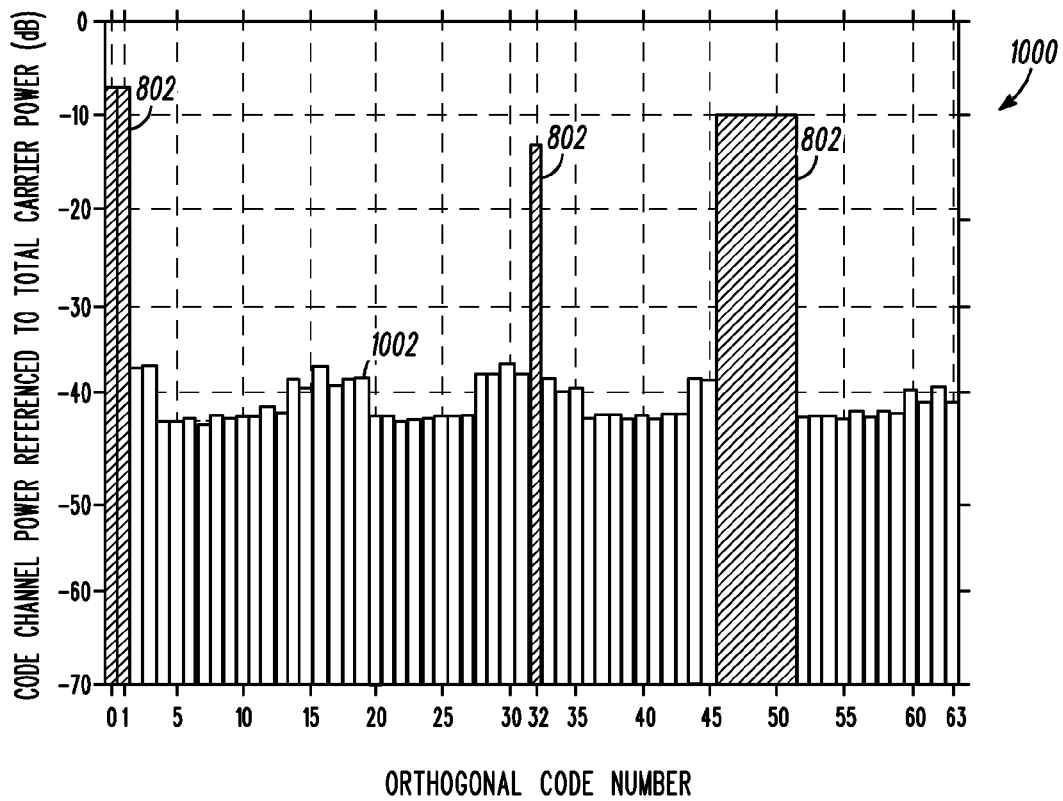
FIG. 10 illustrates a bar graph of orthogonal code domain power of a telecommunications system after combining the window length optimization of FIG. 4 and the two-stage peak cancellation function of FIG. 7.

FIG. 10 illustrates a bar graph 1000 of orthogonal code domain power of a telecommunications system after combining the inverted Hanning window length optimization of FIG. 4 and the two-stage peak cancellation function of FIG. 7. Shown in FIG. 10 are active code correlation envelope power levels 802 and inactive user code correlation envelope power levels 1002.

In FIG. 10, the peak-to-average power ratio seen at the power amplifier input is reduced by 0.5 dB compared to the configuration of FIG. 7 without the window length optimization of FIG. 4, and the orthogonal code domain noise floor has improved by approximately 6 dB. The maximum correlation envelope power of an inactive user code is reduced to about −37 dB.

In order to provide redundancy and to distribute power equally among a number of power amplifiers, power matrices were added to communications systems. A power matrix is a series of hybrid combiners that combines the input signals at specific phase angles. An advantage of this configuration is that the average power may be shared among the power amplifiers, and redundancy may be handled by a smaller number of power amplifiers.

Figure 11:
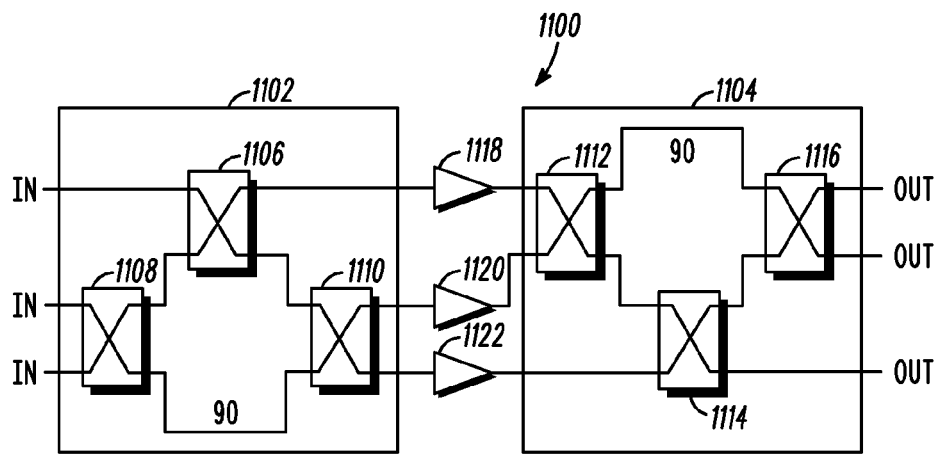
FIG. 11 illustrates a 3×3 power matrix system configuration of the prior art.

FIG. 11 illustrates a 3×3 power matrix system configuration 1100 of the prior art. Shown in FIG. 11 are power matrices 1102 and 1104, hybrid combiners 1106, 1108, 1110, 1112, 1114 and 1116, and power amplifiers 1118, 1120 and 1122.

In FIG. 11, the three power amplifiers 1118, 1120 and 1122 provide redundancy in a three-sector system. Each of the three power amplifiers 1118, 1120 and 1122 receive a combined version of the input signals for all three sectors from the first power matrix 1102. The second power matrix 1104 receives the output of the three power amplifiers 1118, 1120 and 1122 and decomposes the amplified signals into amplified versions of the original input signals to generate the output signals for the three sectors. If one of the power amplifiers 1118, 1120 and 1122 should fail, all three sectors still remain active, albeit at reduced power and degraded signal integrity.

Power matrices also affect the peak-to-average power ratio of the communication signal. Since each power amplifier receives a combination of each sector's communication signals, the peak-to-average power ratio in the combination is different from that of a single sector. The following equations describe the properties of each of the 3×3 power matrices 1102 and 1104:

$$A = A^T$$

$$A \cdot A = \begin{vmatrix} 0 & 0 & 1 \\ 0 & 1 & 0 \\ 1 & 0 & 0 \end{vmatrix}$$

$$y = A \cdot g \cdot x$$

$$z = A \cdot y = A \cdot A \cdot g \cdot x$$

Equation (3)

In equation (3), A represents either of the 3×3 power matrices 1102 and 1104; $A^T$ represents the matrix transpose of A; g represents the gain of each of the three power amplifiers 1118, 1120 and 1122; and x is the communication signal at the input of the three power amplifiers 1118, 1120 and 1122.

The object of the peak cancellation function is to reduce the peak envelope power of the combined communication signal received at the power amplifiers 1118, 1120 and 1122. Accordingly, a digitally created baseband signal that is representative of the signal received at the power amplifier input is needed to utilize the window weighting function in a power matrix-based system. For example, the baseband signal may be generated by making the first power matrix in FIG. 11 a digital power matrix, limiting the peak to average power ratio of the combined signals, up-converting the limited signals to RF, and sending each of the up-converted signals to a power amplifier. In the case of a 4×4 power matrix that has only three sectors of communication data, however, this would imply adding an additional RF up-conversion path. Another arrangement that works well in a power matrix configuration is shown in the following figure.

Figure 12:
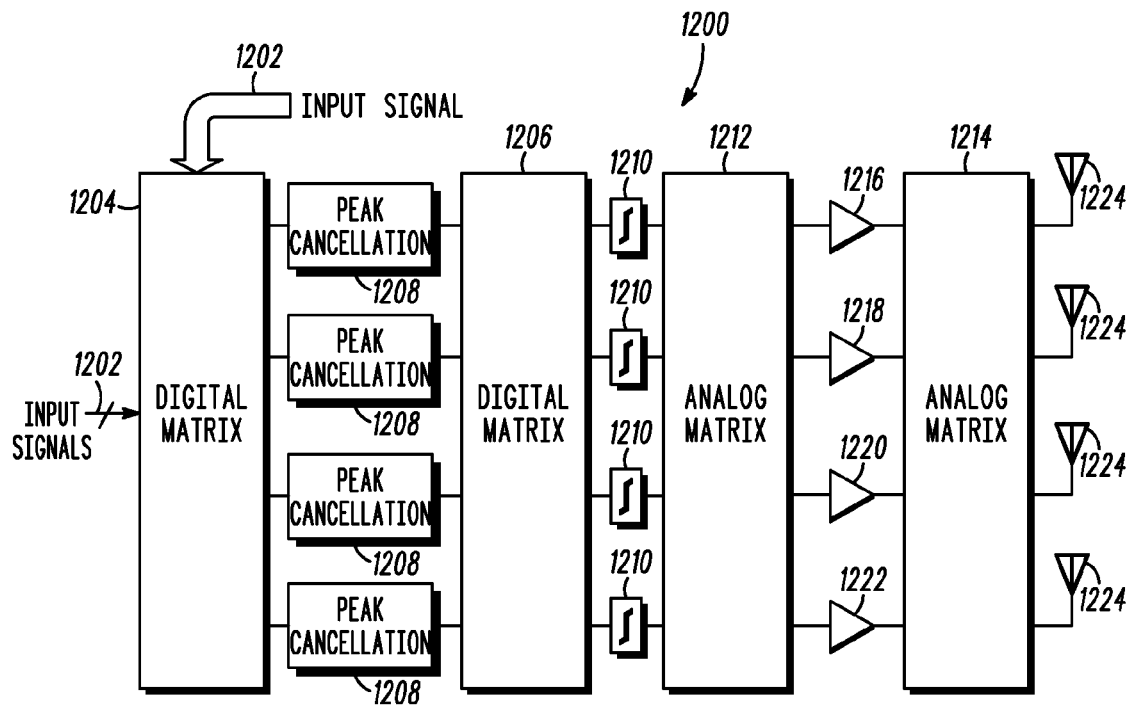
FIG. 12 illustrates a dual digital 4×4 power matrix system that incorporates a peak cancellation function that minimizes power distribution among the inactive user codes.

FIG. 12 illustrates a dual digital 4×4 power matrix system 1200 that incorporates a peak cancellation function that minimizes power distribution in the inactive user codes. Shown in FIG. 12 are input signals 1202, digital power matrices 1204 and 1206, peak cancellation functions 1208, radio frequency up-converters 1210, analog power matrices 1212 and 1214, power amplifiers 1216, 1218, 1220 and 1222, and antennas 1224.

In FIG. 12, the first digital power matrix 1204 is used to combine the input signals 1202. The input signals 1202 are the baseband sector data. The four outputs of the first digital power matrix 1204 are each limited by the peak cancellation functions 1208. The peak cancellation functions 1208 may also be implemented as a single peak cancellation function with multiple inputs and outputs according to well-known techniques, and the term peak cancellation function is intended to include embodiments of one or more peak cancellation functions. The peak cancellation functions 1208 reduce the peak-to-average power of the baseband signals and minimize the power distributed over the inactive user codes, for example, as described above with reference to FIGS. 4 and 7. The peak cancellation functions 1208 may be programmed as identical peak cancellation stages or as independent peak cancellation stages that may be adjusted on an individual basis. The outputs from the peak cancellation functions 1208 are sent through the second digital power matrix to decompose the limited baseband signals into their respective waveforms. The decomposed signals are then filtered, converted to analog signals, and mixed with a local oscillator to the transmit frequency by the radio frequency up-converters 1210. The up-converted signals are then combined by the first analog power matrix 1212. The power amplifiers 1216, 1218, 1220 and 1222 amplify the combined up-converted signals from the first analog power matrix 1212. The second analog power matrix 1214 decomposes the amplified up-converted signals to generate signals having the same waveforms received by the first analog power matrix 1212, amplified by the gain of the power amplifiers 1216, 1218, 1220 and 1222. The decomposed signals are then passed to the respective antennas 1224 for broadcast to each sector of the telecommunications system.

The power matrix configurations in FIG. 12 also affect the error vector magnitude (EVM) and orthogonal noise distribution of each sector. With the dual analog power matrix, the error vector magnitude and orthogonal noise power are increased due to differences in gain and phase response of the power matrices and the power amplifiers. The mismatch in gain and phase results in some portion of each of the input signals being mixed in the output signals instead of each input signal being perfectly reproduced in the corresponding output signal. The degradation of the sector-to-sector isolation is due to gain and phase differences in the analog paths that result in less than perfect vector cancellation at the antennas 1224. To maintain sector-to-sector isolation, which drives the achievable orthogonal noise performance, a digital matrix may be used to balance the analog paths as follows.

Figure 13:
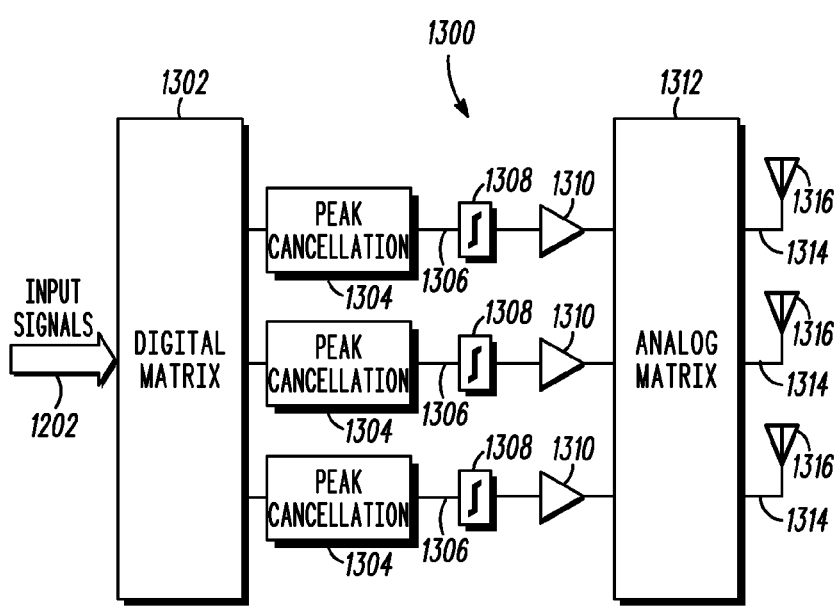
FIG. 13 illustrates a single digital 3×3 power matrix system that incorporates a peak cancellation function that minimizes power distribution among the inactive user codes.

FIG. 13 illustrates a single digital 3×3 power matrix system 1300 that incorporates a peak cancellation function that minimizes power distribution in the inactive user codes. Shown in FIG. 13 are input signals 1202, a digital power matrix 1302, peak cancellation functions 1304, digital signals 1306, radio frequency up-converters 1308, power amplifiers 1310, an analog power matrix 1312, analog paths 1314, and antennas 1316.

In the arrangement of FIG. 13, the gain and phase differences in the analog paths 1314 may be compensated by adjusting the gain and phase of each corresponding digital signal 1306 in the digital power matrix 1302 to remove the differences in the analog paths 1314. Compensating for the gain and phase differences in the analog paths 1314 in this manner prevents gain and phase differences in the analog power matrix 1312 and the analog paths 1314 from dominating the orthogonal code noise power. Also, the orthogonal code noise power at the output of each of the peak cancellation functions 1304 is different from that seen at each corresponding antenna 1316. The difference in the orthogonal code noise power is due to the communication signal being combined by the digital power matrix 1302 at the inputs of the peak cancellation functions 1304 and then being decomposed by the analog power matrix 1214 at the inputs of the antennas 1316. To reduce the orthogonal code noise power between sectors, the gain and phase parameters of each of the peak cancellation functions 1304 may be adjusted individually to produce a uniform orthogonal code noise floor on each of the analog paths 1314. Alternatively, the gain and phase parameters of each of the peak cancellation functions 1304 may be adjusted to move the orthogonal code noise peak to different orthogonal user codes.

Figure 14:
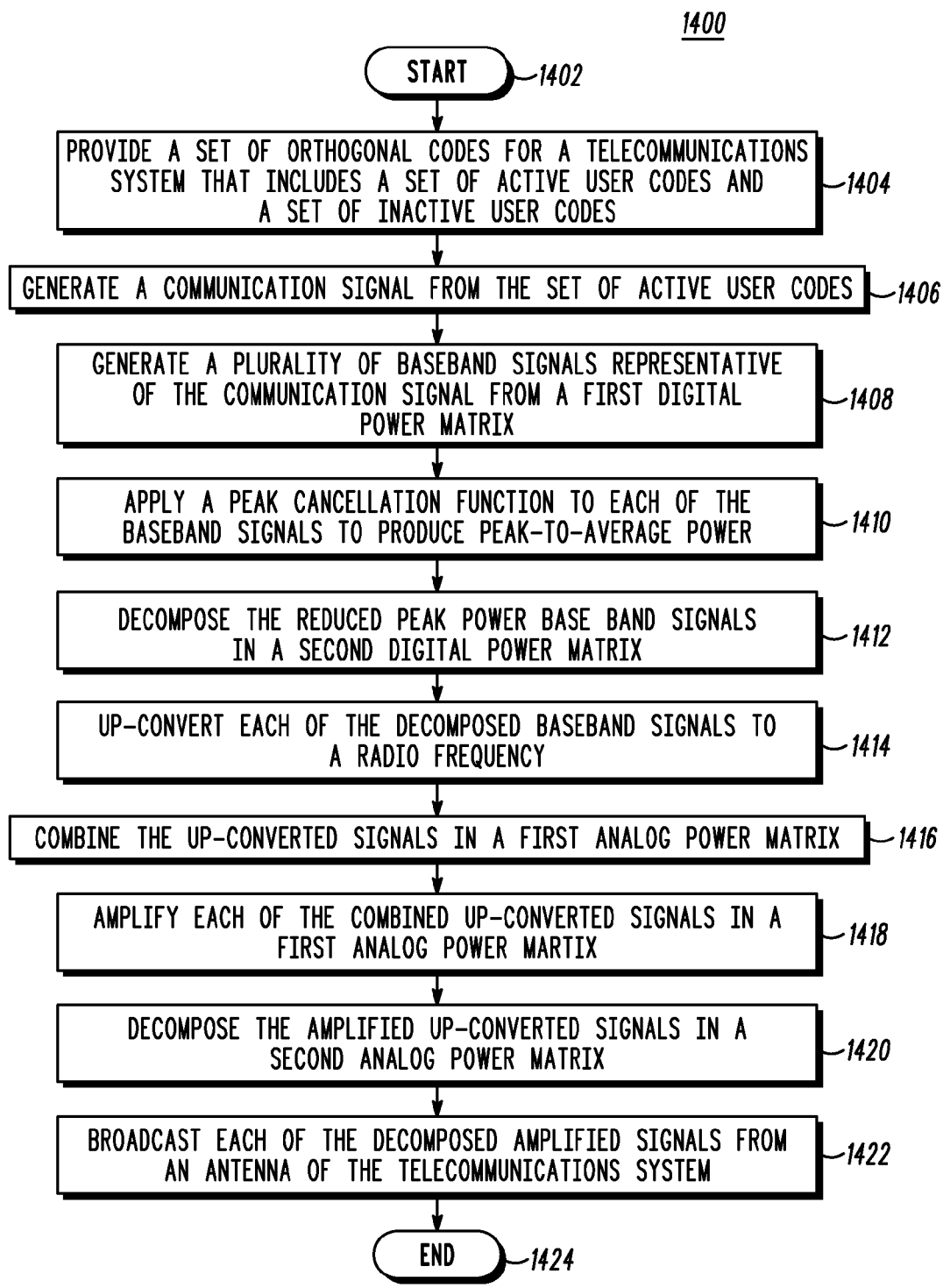
FIG. 14 illustrates a flow chart of a method of reducing transmitter peak power requirements with orthogonal code noise shaping.

FIG. 14 illustrates a flow chart 1400 of one method of reducing transmitter peak power requirements with orthogonal code noise shaping.

Step 1402 is the entry point of the flow chart 1400.

In step 1404, a set of orthogonal codes is provided for a telecommunications system that includes a set of active user codes and a set of inactive user codes.

In step 1406, communication signals are generated from the set of active user codes.

In step 1408, a plurality of baseband signals representative of a summation of the communication signals is generated from a first digital power matrix.

In step 1410, a peak cancellation function is applied to each of the baseband signals to reduce peak-to-average power.

In step 1412, the reduced peak power baseband signals are decomposed in a second digital power matrix to restore the waveform of each of the reduced peak power baseband signals.

In step 1414, each of the decomposed baseband signals is up-converted to a radio frequency according to well-known techniques, for example, by a local oscillator and a mixer.

In step 1416, the up-converted signals are converted to analog and combined in a first analog power matrix.

In step 1418, each of the combined up-converted signals is amplified by radio frequency power amplifiers.

In step 1420, the amplified up-converted signals are decomposed in a second analog power matrix to restore the waveform of each of the amplified up-converted signals.

In step 1422, each of the decomposed amplified signals is broadcast from an antenna of the telecommunications system.

Step 1424 is the exit point of the flow chart 1400.

Figure 15:
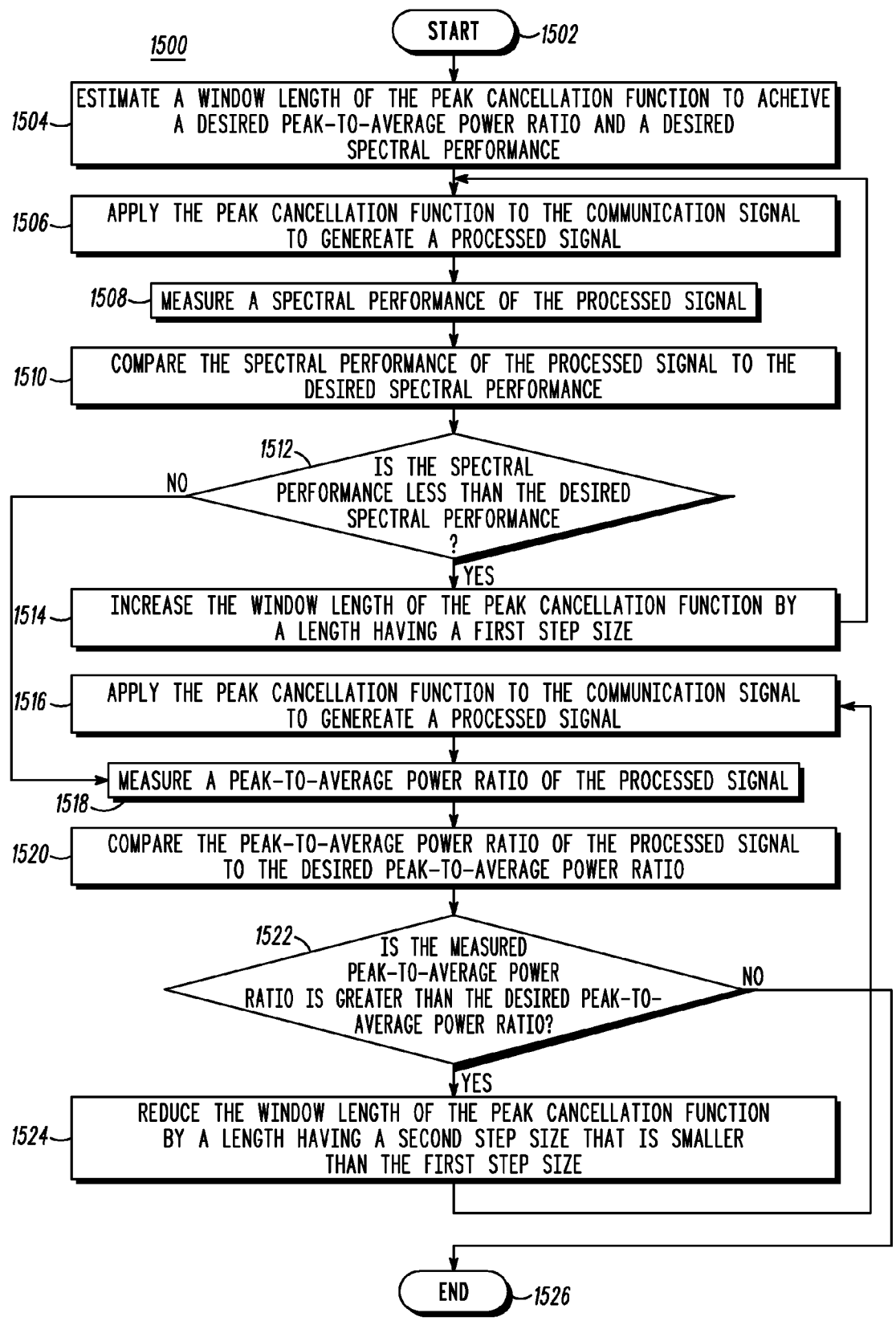
FIG. 15 illustrates a flow chart of a method of adjusting the window length of the peak cancellation function in FIG. 14.

FIG. 15 illustrates a flow chart 1500 of one method of adjusting the window length of the peak cancellation function in FIG. 14.

Step 1502 is the entry point of the flow chart 1500.

In step 1504, a window length of the peak cancellation function is estimated to achieve a desired peak-to-average power ratio and a desired spectral performance.

In step 1506, the peak cancellation function is applied to the communication signal to generate a processed signal.

In step 1508, a spectral performance of the processed signal is measured according to well-known techniques.

In step 1510, the spectral performance of the processed signal is compared to the desired spectral performance.

In step 1512, while the spectral performance of the processed signal is less than the desired spectral performance, the method continues from step 1514. When the desired spectral performance is achieved, the method continues from step 1518.

In step 1514, the window length of the peak cancellation function is increased by a length having a first step size, and the method continues from step 1506.

In step 1516, the peak cancellation function is applied to the communication signal to generate a processed signal.

In step 1518, a peak-to-average power ratio of the processed signal is measured according to well-known techniques.

In step 1520, the peak-to-average power ratio of the processed signal is compared to the desired peak-to-average power ratio.

In step 1522, while the measured peak-to-average power ratio is greater than desired peak-to-average power ratio, the method continues from step 1524. When the desired peak-to-average power ratio is achieved, the method continues from step 1526.

In step 1524, the window length of the peak cancellation function is reduced by a length having a second step size that is smaller than the first step size, and the method continues from step 1516.

Step 1526 is the exit point of the flow chart 1500.

Although the flowchart descriptions above are described and shown with reference to specific steps performed in a specific order, some of these steps may be omitted and/or some of these steps may be combined, sub-divided, or reordered without departing from the scope of the claims. Unless specifically indicated, the order and grouping of steps is not a limitation of other embodiments that may lie within the scope of the claims.

As may be appreciated from the above, minimizing the energy distribution among the set of inactive user codes provides a way to make transmitters at lower cost and to operate them at higher efficiency than previously possible.

The specific embodiments and applications thereof described above are for illustrative purposes only and do not preclude modifications and variations that may be made within the scope of the following claims.

What is claimed is:

1. A method comprising:
   providing a set of orthogonal communication codes for a telecommunications system wherein the set of orthogonal communication codes includes a set of active user codes and a set of inactive user codes;
   generating a communication signal from the set of active user codes;
   reducing peak-to-average power ratio of the communication signal by performing a peak cancellation function on the communication signal that minimizes energy distribution among at least one of the set of active user codes and the set of inactive user codes;
   generating a plurality of combined baseband signals representative of the communication signal from a first digital power matrix;
   performing the peak cancellation function on each of the combined baseband signals to provide reduced peak-to-average power signals;
   decomposing the reduced peak-to-average power signals in a second digital power matrix to provide decomposed baseband signals;
   up-converting each of the decomposed baseband signals to provide up-converted signals;
   combining the up-converted signals in a first analog power matrix to provide combined up-converted signals;
   amplifying each of the combined up-converted signals to provide amplified combined up-converted signals; and
   decomposing the amplified combined up-converted signals in a second analog matrix to provide decomposed amplified up-converted signals.

2. The method of claim 1 wherein the peak cancellation function comprises a non-linear weighting function having a window length that is adjusted to minimize energy distribution among at least one of the set of active user codes and the set of inactive user codes.

3. The method of claim 2 wherein the peak cancellation function comprises multiple stages connected in series or parallel.

4. The method of claim 1 further comprising:
   lengthening a window length of the peak cancellation function in steps having a first step size until a desired spectral performance is achieved.

5. The method of claim 4 further comprising:
   shortening the window length of the peak cancellation function in steps having a second step size smaller than the first step size until a desired peak-to-average power ratio is achieved.

6. The method of claim 1 wherein the peak cancellation function comprises multiple stages connected in series or parallel.

7. The method of claim 1 further comprising:
   broadcasting each of the decomposed amplified up-converted signals from an antenna.

8. An apparatus comprising:
   a set of orthogonal codes for a telecommunications system that includes a set of active user codes and a set of inactive user codes;
   a plurality of communication signals generated from the set of active user codes;
   a first digital power matrix for receiving the communication signals and for generating a plurality of combined baseband signals representative of a summation of the communication signals;
   a plurality of peak cancellation functions for reducing peak-to-average power of the communication signals wherein the peak cancellation functions minimize energy distribution among at least one of the set of active user codes and the set of inactive user codes;
   a second digital power matrix coupled to outputs of the peak cancellation functions to provide decomposed baseband signals;
   a plurality of up-converters coupled to the second digital power matrix for up-converting the decomposed baseband signals to provide up-converted signals;
   a first analog power matrix coupled to the plurality of up-converters for combining the up-converted signals to provide combined up-converted signals;
   a plurality of amplifiers for amplifying each of the combined up-converted signals to provide amplified combined up-converted signals; and
   a second analog matrix for decomposing the amplified combined up-converted signals to provide decomposed amplified up-converted signals.

9. The apparatus of claim 8 further comprising
   an antenna coupled to each of the decomposed amplified signals.

10. The apparatus of claim 8 wherein a gain and phase difference of each of the decomposed amplified up-converted signals may be compensated by adjusting gain and phase of each of the combined baseband signals in the first and second digital power matrices.

11. An apparatus comprising:
   a set of orthogonal codes for a telecommunications system that includes a set of active user codes and a set of inactive user codes;
   a plurality of communication signals generated from the set of active user codes;
   a single digital power matrix for receiving the communication signals and for generating a plurality of combined baseband signals representative of a summation of the communication signals;
   a plurality of peak cancellation functions for reducing peak-to-average power of the communication signals wherein the peak cancellation functions minimize energy distribution among at least one of the set of active user codes and the set of inactive user codes;
   a plurality of up-converters coupled to the single digital power matrix for up-converting the combined baseband signals to provide combined up-converted signals;
   a plurality of amplifiers for amplifying each of the combined up-converted signals to provide amplified combined up-converted signals; and a single analog matrix for decomposing the amplified combined up-converted signals to provide decomposed amplified up-converted signals.

12. The apparatus of claim 11 further comprising:

an antenna coupled to each of the decomposed amplified up-converted signals.

13. The apparatus of claim 11 wherein a gain and phase difference of each of the decomposed amplified up-converted signals may be compensated by adjusting gain and phase of each of the combined baseband signals in the single digital power matrix.

* * * * *